US010198709B2

United States Patent
Brignone et al.

(10) Patent No.: US 10,198,709 B2
(45) Date of Patent: Feb. 5, 2019

(54) MANAGING ASSETS USING AT LEAST ONE POLICY AND ASSET LOCATIONS

(75) Inventors: Cyril Brignone, Mountain View, CA (US); Alan McReynolds, Los Altos, CA (US); Jean Tourrihes, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1673 days.

(21) Appl. No.: 11/389,785

(22) Filed: Mar. 27, 2006

(65) Prior Publication Data

US 2007/0250410 A1  Oct. 25, 2007

(51) Int. Cl.
G06Q 40/04   (2012.01)
G06Q 10/08   (2012.01)
G06F 15/16   (2006.01)

(52) U.S. Cl.
CPC .................................. G06Q 10/087 (2013.01)

(58) Field of Classification Search
CPC ......... G06Q 40/04; G06Q 40/00; G06Q 40/06
USPC ...................................................... 705/36 R
See application file for complete search history.

(56) References Cited

U.S. PATENT DOCUMENTS

| | | | |
|---|---|---|---|
| 5,504,482 A * | 4/1996 | Schreder | 340/995.13 |
| 6,845,410 B1 * | 1/2005 | Brown et al. | 710/29 |
| 2001/0003835 A1 * | 6/2001 | Watts | 709/318 |
| 2003/0148775 A1 * | 8/2003 | Spriestersbach et al. | 455/456 |
| 2004/0193707 A1 * | 9/2004 | Alam et al. | 709/223 |

OTHER PUBLICATIONS

The Cricket Location-Support System. Nissanka B. Priyantha, et al. Sixth ACM International Conference on Mobile Computing and Networking. Aug. 2000. (Year: 2000).*
Websign: hyperlinks from a physical locaiton to the web. Salil Pradhan, Cyril Brignone, Jun-Hong Cui, et al. Internet and Mobile Systems Laboratory. HP Laboratories Palo Alto. Jun. 11, 2001. (Year: 2001).*
SmartLOCUS: An autonomous, self-assembling sensor network for indoor asset and systems management. Cyril Brignone, Tim Connors, Geoff Lyon, Salil Pradhan. Mobile and Media Systems Laboratory. HP Laboratories Palo Alto Jun. 7, 2005. (Year: 2005).*

* cited by examiner

*Primary Examiner* — Alexander G Kalinowski
*Assistant Examiner* — John O Preston
(74) *Attorney, Agent, or Firm* — Mannava & Kang, P.C.

(57) ABSTRACT

Assets are managed using policies. Locations of the assets are also determined. A policy may apply to an asset as determined based on the location of the asset. If a policy applies to the asset, a control function is performed.

22 Claims, 6 Drawing Sheets

MANAGING ASSETS USING AT LEAST ONE POLICY AND ASSET LOCATIONS

BACKGROUND

Tracking and managing computer systems and other equipment can be a monumental task, especially when a large number of items are being tracked. Typically, tracking is performed manually. For example, office equipment for large companies is often manually tracked and managed, and the number of items being tracked may be in the thousands. Employees physically check each piece of equipment for inventory and to update equipment locations. Similarly, large data centers may contain thousands of computer systems that are manually tracked and managed. Manual tracking typically includes physically finding the server or other item being tracked. The location of the server may be written down and then manually entered into a spreadsheet or database. This task is repeated for each server and whenever maintenance is performed that requires movement of a server. The time and expense of manually tracking the computer systems and other equipment is astronomical. Furthermore, errors in entering location information for equipment may waste an enormous amount of time and expense when attempting to find malfunctioning equipment having improperly entered location information.

In addition to tracking equipment, managing the equipment is another monumental task. For example, a data center or other environments may have policies for managing equipment, such as only authorized personnel are allowed to remove servers from a rack. However, implementing the policies and providing notifications of violations is a difficult task. For example, an authorized employee removes a server to take a picture for a company brochure. The server is replaced by the employee but has inadvertently become unplugged. It may take several hours for an administrator to identify the problem and find the server that was unplugged. Furthermore, although the policy of no unauthorized server removal was created, there is no means of automatically implementing and detecting a violation.

BRIEF DESCRIPTION OF THE DRAWINGS

The embodiments are illustrated by way of example and without limitation in the accompanying figures in which like numeral references refer to like elements, and wherein.

DETAILED DESCRIPTION

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

Figure 1:
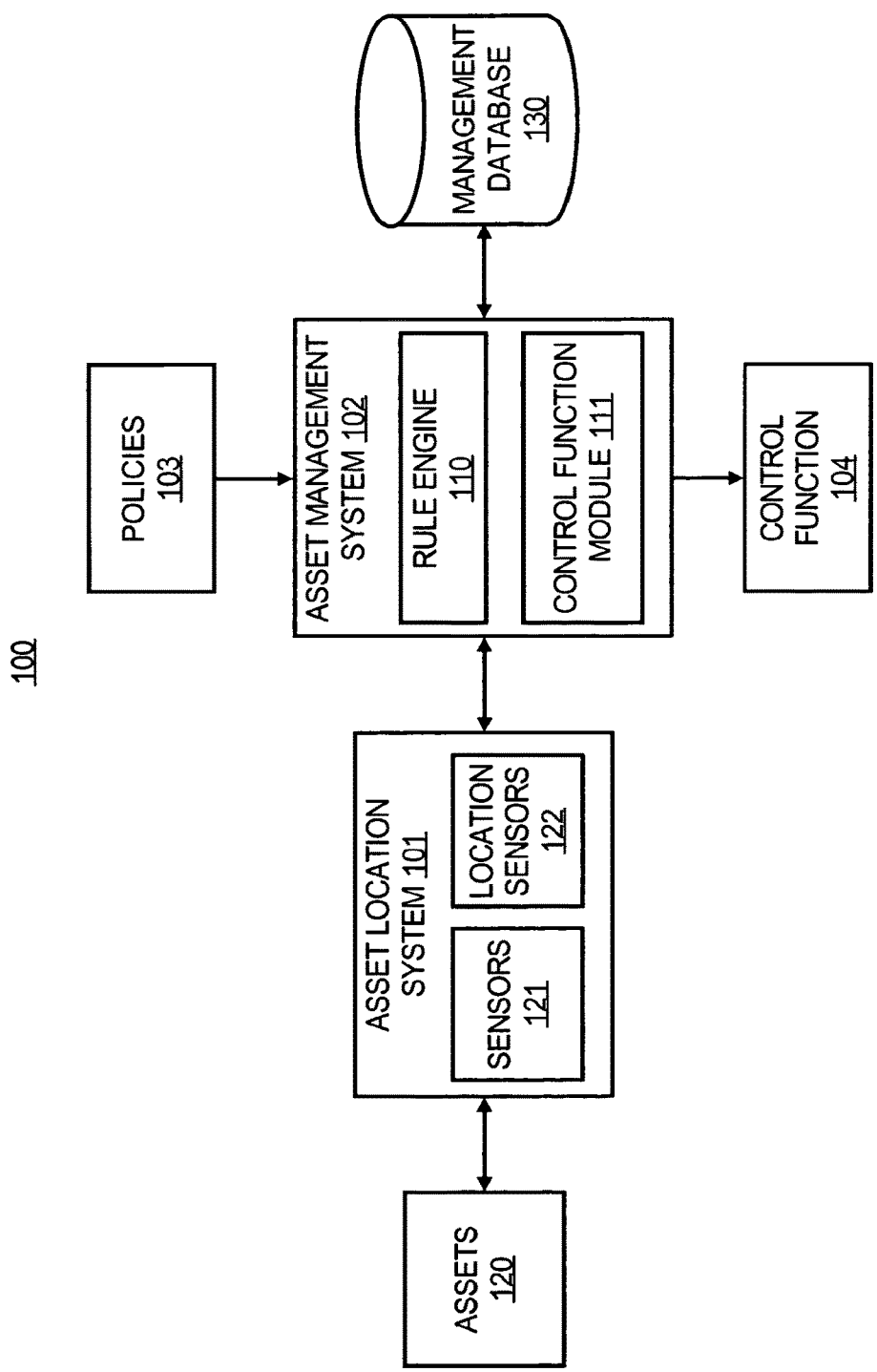
FIG. 1 shows a block diagram of a system, according to an embodiment.

FIG. 1 illustrates a system 100, according to an embodiment. The system 100 includes an asset location system 101 and an asset management system 102. The asset location system 101 determines the locations of assets 120 and transmits the locations to the asset management system 102. An asset is any object that can be tracked. For example, an asset may include an electronic device, such as laptops, servers, and the like. Assets may also include non-electronic devices. In one embodiment, the assets are equipment in a data center. Examples of assets in a data center include computers, servers, switches, routers, power supplies, and storage appliances. The data center assets may be housed in racks. Assets that are not housed in racks and are not necessarily in a data center may also be tracked, such as laptops, printers, various machineries and racks or other storage units.

The type of location sensors 122 used may be based on the type of asset location system used. Examples of asset location systems that may be used in the system 100 for determining the locations of the assets 120 and tracking the assets 120 include but are not limited to RFID systems, Global Positioning System (GPS) systems, RSSI triangulation systems, and ultrasound systems. A GPS system may use a GPS receiver to calculate locations using signals from GPS satellites. Many commercial location systems are based on RSSI triangulation using 802.11; where access points measure signal strength from the asset to determine its location. Radio frequency (RF) systems measuring time of arrival to determine asset locations or RF/ultrasound systems measuring signal propagation speed difference between RF and ultrasound signals may be used to determine asset locations. An asset tracking system using RFID tags and readers, such as described with respect to FIG. 2, may also be used.

The asset location system 101 may also include sensors 121 for determining sensor information associated with the assets. For example, the sensors 121 may include temperature sensors, rack door position sensors, sensors for detecting whether users are authorized, and other types of sensors known in the art. The sensor information from the sensors 121 is sent to the asset management system 102 for managing the assets 120. It will be apparent to one of ordinary skill in the art that the sensors 121 may be included in a system that is separate from the asset location system 101.

The asset management system 102 is operable to receive the locations of the assets from the asset location system 101 and manage the assets using the locations and policies 103. The asset management system 102 is also operable to receive the sensor information from the sensors 121, and the sensor information may also be used to manage the assets 120. The locations and the sensor information may be stored in a management database 130. Also, the policies 103 may be stored in the management database 130.

According to an embodiment, the asset management system 102 includes a rule engine 110 and a control function module 111. The rule engine 110 determines whether one or more of the policies 103 apply to one or more of the assets 120 based on one or more of the locations of the assets 120 and the sensor information for the assets 120. The policies 103 are rules for managing the assets 120. The policies may be defined by system administrators and stored in the management database 130 or generated through other means. The management database 130 may be updated with new or revised policies.

The asset management system 102 also includes the control function module 111. The control function module 111 performs a control function 104 if the rule engine 102 determines that a policy applies to one or more assets. A control function is an automated action taken in response to a policy being applicable to one or more assets. A control function may include generating feedback indicating that a policy applies. The feedback may be provided as an alert, which may include sending an alert message, such as an email, page or text message, activating an audible or visual alert device, or generating another type of alert. The alerts may include user alerts for notifying system administrators or other users. Other examples of control functions include migrating server operations to other locations, triggering an automatic backup, controlling air flow, and generating a guided procedure. Through the policies 103, location and/or sensor information for the assets 120, and control functions, the asset management system 102 is operable to automatically recognize and react to dynamic conditions, which are referred to as change management.

Examples of the policies 103 and control functions are as follows, however, it will be apparent to one of ordinary skill in the art that policies other than described herein may be implemented by the asset management system 102.

One example of a policy includes that a specific critical server should not be moved at all, or not moved outside of a specific location. If the server is moved, the rule engine 110 determines that the policy is applicable to the server based on the location of the server. The control function module 111 generates an alert, such as sending an email or text message to a system administrator.

Another example of a policy includes that a server performs a specific function and the backup server for the same function should never be located in the same rack. If the server or the backup server is moved in the same rack, such as determined by the locations received from the asset location system 101, the rule engine 110 determines that the policy applies to the server and the backup server, and the control function module 111 may automatically elect a new server to be the new backup server, and migrate the backup function from the old backup server to the new backup server. Alternatively, the control function module 111 may communicate with another system that selects the new server and performs the migration. Also, a system administrator may be notified.

Other examples of policies use the sensor information from the sensors 121 and may use the locations of the assets being affected to determine whether a policy applies or whether to perform a control function. For example, an area in a data center or another environment is cooled by a cooling system. A policy may determine that a certain type of server requires a lower ambient temperature than usual. The temperature information from temperature sensors is used to verify that those types of servers are not too hot. If one of such servers is too hot, the control function module 111 sends a signal to turn up the airflow for that server. In another example, a policy may require that a server performing a critical processing function is to be located in a cool zone of a data center. The temperature information is used to check the temperature of that specific server. If this server becomes too hot, the control function module 111 migrates the function from the hot server to a new server.

In another example, a rack door sensor is used to determine whether assets located at a particular rack are being accessed. If the door of a rack where a critical server resides is opened, an alert may be generated. Also, sensors, such as cameras, badge readers, etc., may be used to detect unauthorized access to assets at particular locations and to trigger control functions, such as generating alerts. The rule engine 110 determines that the policies regarding accessing the assets apply to the assets in the rack, and the control function module 111 generates the alert. The alerts may include the locations of the assets that are affected.

Other policies may include generating procedures for managing assets using the location of the assets and parameters specified in the policies for managing the assets. The procedures may include guided procedures that guide user action for performing a control function on the assets. For example, a policy includes performing scheduled maintenance, such as performing upgrades, on computer systems. The policy applies to assets that are due for maintenance based on the schedule in this example. The control function module 111 determines the locations of the assets and generates a list of the locations so an administrator can perform the maintenance. The assets may be ordered such that the administrator performs the maintenance in the specified order. The order may be determined such that if the order is followed, the least amount of time is spent walking to each asset or otherwise accessing each asset. A map may be generated that includes a path to each of the assets in the specified order. For example, in a data center, a path through the data center showing the locations of the assets and the order to be followed may be generated. Known visualization tools may be used to generate the map. The policies including guided procedures may not be limited to maintenance and may include policies that guide a user to access assets for reasons other than maintenance. Also, if the procedure is not performed or if the order is not followed an alert may be generated.

Other examples of policies generating procedures for managing assets include retiring all servers of a particular model, and generating a map of the data center identifying each rack housing the servers and how many servers need to be retired. A policy may specify upgrading all the servers with less than a predetermined amount of memory. A map including the locations and the slots of the servers in a racks housing the servers is generated. Also, a step by step upgrade procedure may be provided. In another example, sensor information is used to determine whether the policy applies. For example, critical servers are to be moved to cool zones of a data center. The control function module 111 generates a map showing current locations and new locations for moving the critical servers.

Out of band signaling, which may include activating alert devices associated with assets, may be used to identify assets that need to be accessed or to identify assets for other reasons. Out of band signaling is described in further detail below with respect to FIG. 3.

Figure 2:
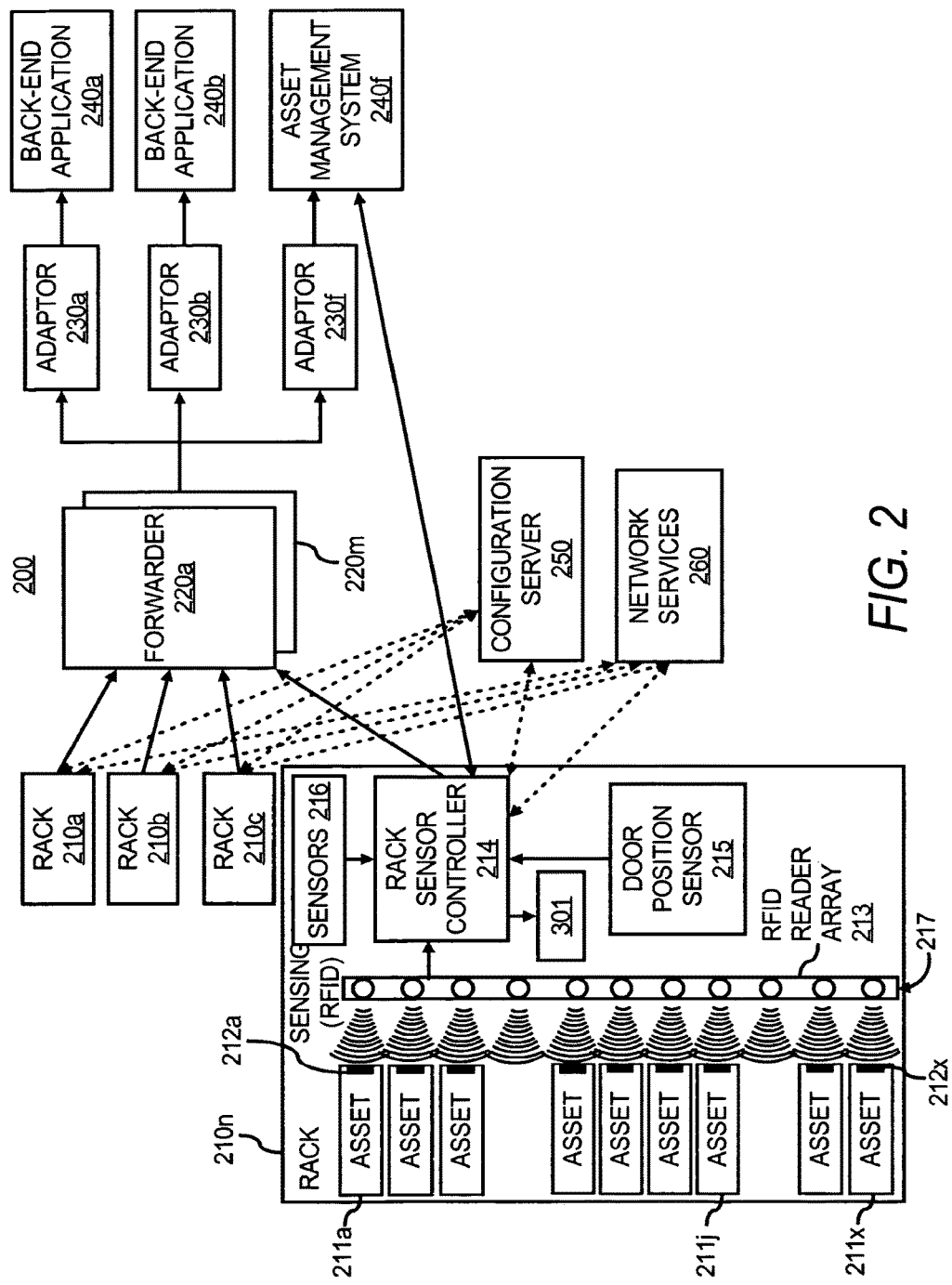
FIG. 2 shows a block diagram of another system, according to an embodiment.

FIG. 2 illustrates a system 200 operable to determine the locations of assets and track and manage assets, according to an embodiment. The system 200 may be used for assets in a data center or for assets in other environments. The assets are tracked using RFID tags and readers in one embodiment.

The system 200 includes racks 210*a-n* housing assets, forwarders 220*a-m*, adaptors 230*a-f* connected to back-end applications 240*a-f*, a configuration server 250, and network services 260. The racks 210*a-n* house many of the assets that may be tracked using one of more of the back-end applications 240. A detailed illustration of one of the racks, 210*n*, is shown in FIG. 2, including assets 211*a-x* having RFID tags 212*a-x*. The assets 211*a-x* may be provided in each slot of the rack 210n. The racks 210a-n may include conventional server racks. Conventional racks may include 42 or more slots or a lesser number of slots, such as 22 slots, and one or more assets may be provided in each slot. The components shown for the rack 210n may be provided for each of the racks 210.

The RFID reader array 213 performs asset detection. The RFID tags 212a-x are read by the RFID reader array 213. Data from the RFID reader array 213 is transmitted to a rack sensor controller 214.

In one embodiment, the RFID reader array 213 includes a reader positioned relative to each slot in the rack 210 to read the RFID tags 212a-x for each asset 211a-x. For example, each reader energizes a corresponding RFID tag 212a-x mounted to an asset 211a-x in a slot in the rack 210n. If the RFID tag, and thus the asset, is present, the RFID tag in that slot transmits its asset ID to the RFID reader in the RFID reader array 213 and is sent to the rack sensor controller 214. In this embodiment, 217 represents a reader per slot.

In another embodiment, the RFID reader array 213 includes a reader antenna positioned relative to each slot in the rack, instead of using a reader per slot, to read the RFID tags 212a-x for each of the assets 211a-x. Multiple antennas in the RFID reader array 213 may be connected to a single reader. A switching circuit may be used to selectively activate particular antennas to determine whether an asset is in a particular slot in the rack 210n. Each antenna may be designed to detect tags only in its corresponding slot and/or circuitry may be provided to prevent coupling of near-by antennas to facilitate reading an RFID tag in a corresponding slot. One RFID reader 213 array may be provided for multiple antennas, thus saving costs on readers. In this embodiment, 217 represents an antenna per slot.

In another embodiment, there is 1-s readers for 1-n slots in a rack. In this embodiment, one or more readers may be provided for a rack, but the number of readers or the number of reader antennas is not necessarily equivalent to the number of slots in a rack. There may be more or less readers or reader antennas than number of slots.

The RFID reader array 213 may be embedded or mounted on the rack, such as on the front door or in another location on the rack. In one example, the RFID reader array 213 is a series of one or more circuit modules. Each module includes a circuit board pairing that contains one RFID reader and a matching board containing seven RFID antennas. Each module covers a total of seven slots and hence six circuit modules can cover all the slots in an industry standard "42U" rack. Inter-module communication between the rack sensor controller 214 and the reader boards may be performed using a single shared serial port. This port daisy-chains through the reader boards and is used for autonomous module enumeration and for message passing between the modules.

One feature of the system 200 is the ability to perform pinpoint asset detection. For example, each of the racks 210a-n is fitted with an RFID reader array that autonomously probes for assets with at least a resolution of one slot. The benefits of this design are numerous. Unlike manual and barcode methods, probing is automatic and nearly continuous. No staff intensive activity is required and data is up to date. Also, asset identification is based on the data read from the RFID tags that may each be programmed with an asset ID. No mapping is needed after reading the RFID tags to cross-reference logical names, such as hostname or addresses, with permanent asset keys or IDs. Because the asset detection mechanism is external, discovery occurs even when assets are nonfunctional, powered down or detached from the network. There is also no dependence on the production infrastructure for tracing back through network wiring. Lastly, the system 200 performs better than a sparse collection of RFID readers. Asset localization can be performed in-situ and in real-time. The pinpoint resolution of a slot in a rack means that location accuracy is as small as possible, such as down to actual asset sizes.

It will be apparent to one of ordinary skill in the art that the number of components shown in the system 200 is by way of example and not limitation. The number of components may vary based on the number of assets being tracked or other factors.

Furthermore, the system 200 is modular and highly scalable. The RFID reader arrays, rack sensor controllers, forwarders 220a-m, adaptors 230a-f, configuration server 250 and the network services 260 modularize the various functions which control the flow of location information. For example, when there are multiple back-end systems, such as the back-end applications 240a-f, the forwarders 220a-m can replicate and route information independent of either the rack hardware, such as rack sensor controller, or the back-end systems. The modular design means that the various connections can be reconfigured easily and on-the-fly.

Furthermore, installation of various components of the system 200 in an existing data center may not result in much down-time. For example, the tags 212a-x are simply attached to each of the assets 211a-x, which can be done while the assets 211a-x are up and running. The RFID tags 212a-x can then be programmed with the ID of the asset. One method may include a combination barcode reader/RFID writer which copies the serial and model numbers of the asset over to the tag. The manual tasks of tag attachment and programming are fast and may only need to be done once over the lifetime of the asset.

The rack sensor controllers for each of the racks 210a-n, which includes the rack sensor controller 214, receive sensor information acquired by the RFID reader arrays and other sensors. For example, the rack sensor controller 214 receives sensor information from the RFID reader array 213, a door position sensor 215 sensing whether a rack door has been opened or closed, and the sensors 216. Examples of the sensors 216 include but are not limited to temperature sensors, humidity and other environmental sensors, and sensors detecting whether an asset has been added or removed from a slot in a rack. Another type of sensor of the sensors 216 may include an operator ID sensor that determines the ID of an operator accessing a rack or an asset in a rack. Operator ID sensors may be used to determine whether authorized personnel are accessing an asset. The sensors 216 and the door position sensor 215 are optional.

These sensors send sensor information to the rack sensor controller 214. The sensor information may include measurements or other sensed information, sensor ID, reader ID, and possibly other information.

Location information for each of the racks 210a-n may be stored in the rack sensor controllers for each of the racks 210a-n. An example of location information for a rack in a data center may include a 4-parameter location comprising a main location, a space in the main location, an aisle in the space, and a rack number in the aisle. The space, for example, is a room or space in the main location. The number is a number identifying a rack in the corresponding aisle. This location may be manually entered or sent to the rack sensor controllers from a configuration server 250. Other parameters may be used for the location information.

Many data centers use a logical description, such as the triplet of room number, aisle number and rack number. The location information may be sent to the asset management system 102 to be used as locations for the assets.

Manual entry of the location information may be performed to minimize the possibility of storing an incorrect location in a rack sensor controller. Location information may also be transmitted from the configuration server 250 when the rack sensor controller 214 is first booted up or updated.

The location information may also include a slot number of a rack. For example, the asset 211*j* is detected in slot 10 of the 42-slot rack 210*n*. The slot number is stored in the rack sensor controller 214 as part of the location information along with associated sensor information.

Data may be programmed into the RFID tags for tracking. For example, asset IDs for the assets 211*a-x* are stored in the RFID tags 212*a-x*. The IDs may include a customer key for each asset. The customer key comprises a unique ID provided by a user for each asset. In another example, the IDs include an asset serial number, a product number, and a manufacturer ID for each asset. The tag serial numbers provided by the tag manufacturers may also be used in IDs.

In one example, the door position sensor 215 sends data to the rack sensor controller 214 indicating whether a door for the rack 210*n* is opened or closed. Determining whether the door is opened or closed are examples of detecting a change in state, which may include detection of a predetermined event. The rack sensor controller 214 may perform certain functions in response to detecting a predetermined event. For example the rack sensor controller 214 performs an RFID scan when the door closes and also on a periodic basis. The RFID scan includes reading RFID tags 212*a-x* in the slots in the rack 210*n* using the RFID reader array 213. The rack sensor controller 214 sends the sensor information and location information to one or more of the back-end applications 240*a-f* via components, such as the forwarders 220*a-m* and the adaptors 230*a-f*. For example, the rack sensor controller 214 formats the sensor and location information into a message, and sends the message over a network to, for example, the forwarder 220*a*.

Rack sensor controllers may be programmed to perform RFID scans or perform other functions in response to detecting an event other than the opening or closing of a rack door. For example, some of the racks 210*a-n* may not include doors. A sensor may be included on these racks that detects when an asset is pulled out of a slot or pushed into a slot. RFID scans may be performed upon detecting one of these events. A periodic RFID scan on no-door racks may be performed to generate both event or state messages, if a change is detected, and inventory messages, on a periodic basis.

Sensor information and location information may also be sent to the forwarder 220*a* in messages from the rack sensor controllers. The forwarders 220*a-m* forward the messages to one or more of the back-end applications 140*a-f* and may provide load-balancing and fail over. Each of the forwarders 220*a-m* may collect information from the rack sensor controllers of the racks 210*a-n* and dispatch the information to one or more of the back-end applications 220*a-f* via adaptors 230*a-f* corresponding to the back-end applications 220*a-f*. Each of the back-end applications 240*a-f* may use its own data format and procedures. The adaptors 230*a-f* convert messages from the forwarders 220*a-m* to a format compatible with a corresponding back-end application.

The messages generated by the rack sensor controllers for transmission to the back-end applications 240*a-f* may be state or stateless messages, according to an embodiment. A state message may be generated when a change in state of a rack is determined and sending the change in state to a back-end application in the state message. For example, the rack sensor controller 214 performs an RFID scan, which may be a periodic RFID scan or an RFID scan performed in response to the rack door being closed or temperature exceeding a threshold. The rack sensor controller 214 determines that asset 211*j* has been added to slot 10. The rack sensor controller 214 sends a state message to the back-end application 240*a* indicating the asset 211 has been added to slot 10 for rack 210*n* and tag data read from the RFID tag 212*j*. The rack sensor controller 214 may generate a state message in response to detection of a predetermined event, such as a rack door closing or temperature exceeding a threshold. The state message includes changes in the state of the rack, such as an asset is added or removed or a reading error occurred or temperature exceeds a threshold, etc. The state message may be generated and transmitted in response to detecting a change in state. The state message is transmitted to a back-end application also keeping track of the state of the rack. For example, the state includes the asset 211*j* has been added to the rack since the last message or last inventory. The back-end application 240*a* receives the update state of the asset 211*j* and changes the state of the rack 210*n* stored at the back-end application 240*a* to include the newly added asset 211*j*.

A stateless message may include the entire state of a rack, which can be sent to a back-end application. For example, the rack sensor controller 214 receives tag data from all the assets 211*a-x* in the rack 210*n* from the RFID reader array 213 and generates a message including all the tag data. For example, an inventory message is a message including the current state of all the assets in a rack that are being tracked. The rack sensor controller 214 sends the inventory message to, for example, the back-end application 240*a*. Stateless messages may be generated periodically. For example, an RFID scan of the assets 211*a-x* in the rack 210*n* is performed every hour and an inventory message is generated and transmitted to the back-end application 240*a*. In one embodiment, RFID scans are performed more often than the transmission of inventory messages, which includes data from the RFID scans.

The back-end applications 240*a-f* process information from the rack sensor controllers and make the information available to users, which may be performed in real-time. The back-end applications 240*a-f* may include but are not limited to databases, visualization tools and management tools, such as HP OpenView. The number and type of back-end applications may vary for each data center. To maximize operational ease of use and efficiency, asset location information may be integrated into an existing management application already deployed in the data center. In addition, a stand-alone, back-end, asset tracking application may be provided as one of the back-end applications 240*a-f*.

Figure 3:
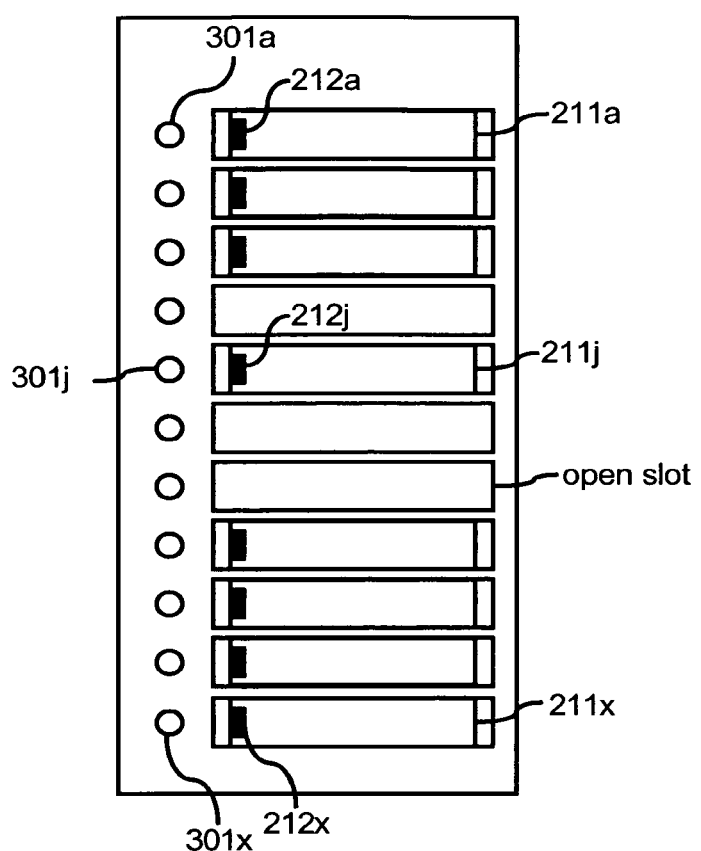
FIG. 3 shows a block diagram of a rack with alert devices, according to an embodiment.

According to an embodiment, the asset management system 102 shown in FIG. 1 is provided as a back-end application in the system 200 shown in FIG. 2. The asset management system 102 is shown in FIG. 2 as the back-end application 240*f*. Location and sensor information for the assets is received from the rack sensor controllers and used to determine whether any of the policies 103 are applicable to the assets. Also, control functions may include sending messages to the rack sensor controllers or other systems. For example, the asset management system 102, shown as the backend application 240*f*, determines that a policy is applicable to one or more assets of the assets 211. The asset management system 102 performs a control function, such as sending a message to the rack sensor controller 214 instructing the rack sensor controller 214 to activate one or more alert devices 301. The alert devices 301 are also shown in FIG. 3 and are described in further detail below. In another example, the asset management system 102 may send messages to the rack sensor controllers to activate alert devices indicating the assets to be accessed in a guided procedure. Other examples of the policies 103 that may be used for managing assets in the system 200 are described above.

The network services 260 may include standard network services found on most intranets. Examples of network services may include auto-configuring TCP/IP stacks for rack sensor controllers, synchronizing time clocks of the rack sensor controllers, and the like.

The configuration server 250 manages the configuration of the rack sensor controllers for the racks 210a-n from a central location to simplify management of the rack sensor controllers. The configuration server 250 may be connected to the rack sensor controllers of the racks 210a-n via a network for sending configuration information. For example, when the rack sensor controller 214 is booted up, it automatically fetches its configuration data from the configuration server 250. The configuration data may include which of the forwarders 220a-m the rack sensor controller 214 is to transmit messages. A list of addresses for forwarders may be sent to the rack sensor controller 214. The configuration data may include several other parameters that may be customized for each rack sensor controller. For example, the configuration data may specify the time intervals for conducting an inventory, whether RFID tags should be read when the rack door is opened or closed, threshold values for temperature sensors, and other specified parameters.

According to an embodiment, alert devices are provided that generate an alert associated with assets. The alert devices may be powered by a power source independent from the assets. Thus, if one or more of the assets malfunction or becomes in-operational, the alert devices are still operable to generate an alert, which may include an alert indicating that an asset is down.

In one embodiment, the alert devices are provided on a rack, such as shown in FIG. 3. However, the alert devices may be provided on other types of storage units and each alert device may be associated with one or more assets. An alert device may be located adjacent to the one or more assets that the alert device is associated with, so if the alert device is activated it is easy to quickly identify the asset or assets that are associated with the alert.

FIG. 3 shows alert devices 301a-x corresponding to each of the assets 211a-x. The alert devices 301a-x may be provided on the rack 210n. The alert devices 301a-x may include LEDs or other visual devices, audible alert devices, a combination of visual and audible devices, or other alert devices as are known in the art. The locations of the alert devices 301a-x are not limited to the locations shown in FIG. 3. The alert devices 301a-x may be located proximate the slots for the rack 210n to provide information about corresponding assets 211a-x. The alert devices 301a-x may be physically independent from the assets 211a-x. For example, the alert devices 301a-x may not be attached to the assets 211a-x. Also, the alert devices 301a-x may receive power from a power supply independent of a power supply supplying power to the assets 211a-x.

In one embodiment, the alert devices 301a-x may be mounted on the rack in positions corresponding to the slots for the assets. The RFID reader array 213 and other components for the rack 210n shown in FIG. 2 may also be provided for the rack 210n but are not shown in FIG. 3 for purposes of simplifying the illustration of the alert devices 301a-x used in the rack 210n. Also, the alert devices may be provided for each of the racks or at least some of the racks 210 in the system 200 shown in FIG. 1.

Each of the alert devices 301a-x correspond to an asset of the assets 211a-x and are operable to generate a signal indicating information about an asset. The alert devices 301a-x may be controlled by the rack sensor controller 214 to generate an alert in response to a detected event or in response to another condition. For example, the rack sensor controller 214 may detect the asset 211j is not operational from sensor information. The rack sensor controller 214 activates the alert device 301j to generate a signal to indicate the asset 211j is down. In another example, the network services 260 determine that the assets 211a, 211j and 211x need software updates. The network services 260 send a message to the rack sensor controller 214 indicating that the assets 211a, 211j and 211x need software updates. The rack sensor controller 214 activates the alert devices 301a, 301j and 301x to generate a signal to indicate the assets 211a, 211j and 211x need software updates.

A control function performed in response to a policy being applicable to one or more of the assets may be used to activate one or more of the alert devices. For example, the asset management system 102 shown in FIG. 1 performs a control function, such as sending a message to the rack sensor controller 214 to activate one or more of the alert devices 301a-j. For example, a policy may apply that indicates that the asset 212j needs to be accessed for maintenance. The asset management system 102 sends a message to the rack sensor controller 214 requesting the alert device 312j be activated. Activation of the alert device 312j may be part of a guided procedure set forth by a policy. If the procedure is not followed for a particular asset then the alert device for the asset may be activated. In another example, if the policy is that a critical server at a particular location should not be moved, the alert devices at the new and old locations may be activated.

In yet another embodiment, the asset management system 102 receives a request from a user or another device to activate an alert device associated with an asset or the asset management system 102 determines that an alert device for the asset needs to be activated based on a policy. The asset management system 102 determines the location of the asset, for example, from locations stored in the management database 130. A message is generated and transmitted to the rack sensor controller where the asset is housed. The location of the asset may be used to determine where to send the message and may be used to identify the asset at the rack sensor controller. For example, information sent in the message may include an RFID tag serial number for an RFID tag used to track the asset, a MAC address for the asset, or an identification of a slot in a rack where the asset resides. In one embodiment, the message is sent to a rack sensor controller for a rack where the asset is housed, and the rack sensor controller determines the associated alert device to activate based on the location or related location information in the message.

The rack sensor controllers, in addition to being operable to activate the alert devices, are also operable to deactivate the alert devices. For example, after a control function is performed or after a system administrator provides notification that activation of an alert device is acknowledged, a rack sensor controller may deactivate an alert device. The rack sensor controller may receive a signal from the asset management system or another system 102 indicating that a control function for an asset was performed, or the rack sensor controller may receive input from a system administrator acknowledging activation of an alert device. The rack sensor controller deactivates then deactivates the corresponding alert device or alert devices.

Figure 4:
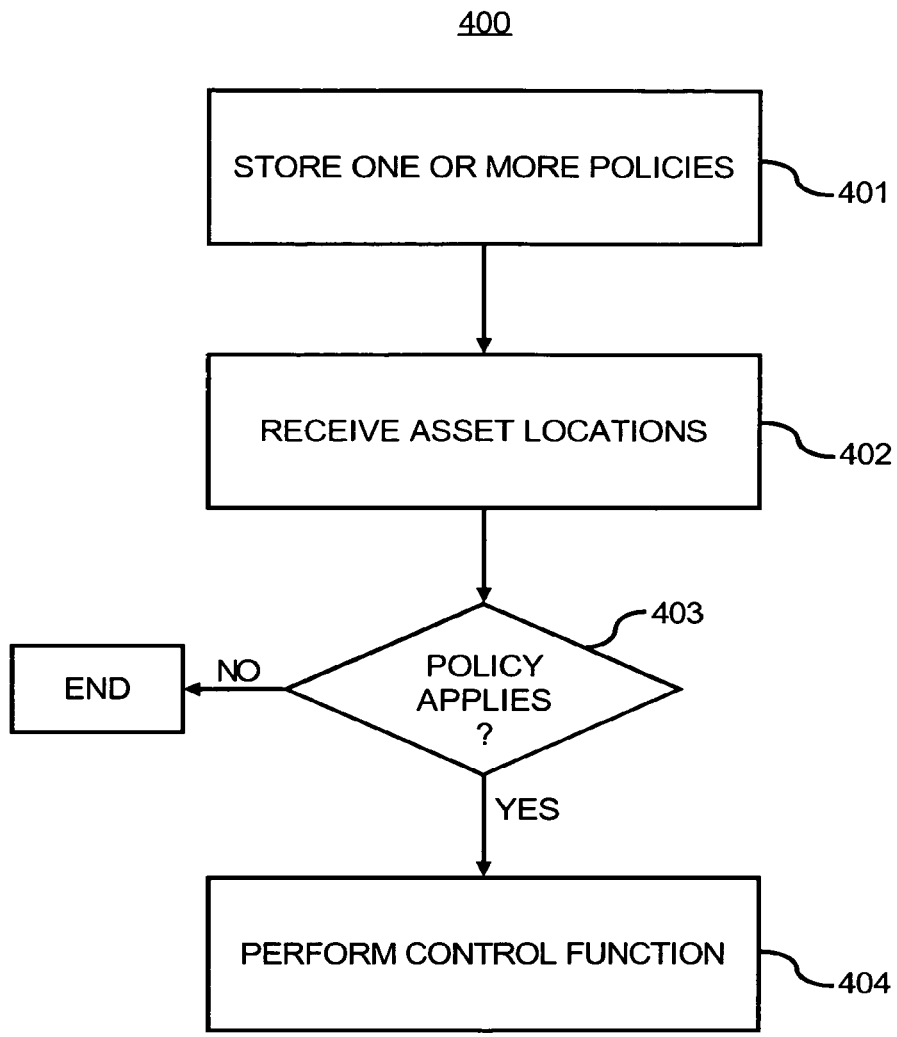
FIG. 4 shows a flow chart of a method, according to an embodiment.

FIG. 4 shows a flow chart of method 400 for managing assets in a rack using one or more policies, according to an embodiment. The method 400 is described with respect to one or more of FIGS. 1-3 by way of example and not limitation. The method 400 may be used with other systems not shown.

At step 401, the asset management system 102 stores one or more policies for managing assets. The policies may be stored in the management database 130.

At step 402, the asset management system 102 receives the locations of the assets 120 from the asset location system 101.

At step 403, the asset management system 102 determines whether a policy applies to one or more of the assets 120 based at least in part on their locations. In one embodiment, determining whether a policy applies may include determining whether an asset is affected by rules specified in the policy. Sensor information from the sensors 121 may also be considered if the policy uses the sensor information to make a decision.

At step 404, the asset management system 102 performs a control function if the policy applies to one or more of the assets. In one example, the control function includes performing a control function on the asset. In other examples, the control function includes controlling another system that may directly or indirectly affect the asset. For example, a cooling system may be controlled, which indirectly affects the asset, or a process migration system is requested to migrate the processes of a critical server to another server, which directly affects the server. Other types of control functions may also be performed.

Figure 5:
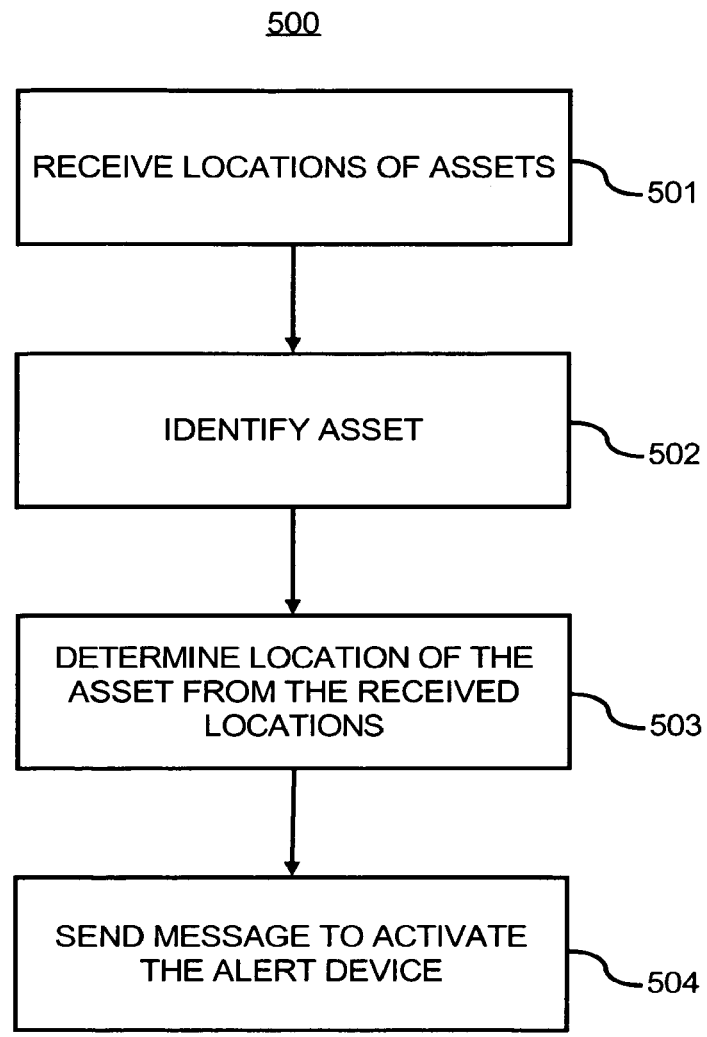
FIG. 5 shows a flow chart of another method, according to an embodiment.

FIG. 5 shows a flow chart of method 500 for controlling activation of one or more alert devices associated with assets, according to an embodiment. The method 500 includes steps for activating alert devices, which may be performed as an embodiment of the control function described at step 404 in the method 400. The method 500 is described with respect to one or more of FIGS. 1-3 by way of example and not limitation. The method 500 may be used with other systems not shown.

At step 501, the asset management system 102 shown in FIG. 1 receives locations of the assets 120.

At step 502, the asset management system 102 identifies an asset for which an alert device is to be activated. For example, asset management system 102 determines that a policy is applicable to an asset and the control function is to activate the alert device for the asset.

At step 503, the asset management system 102 determines the location of the asset from the received locations.

At step 504, the asset management system 102 sends a message to activate the alert device associated with the asset. For example, the asset management system 102 determines that a policy applies to the asset and sends a message to the rack sensor controller controlling the alert device for the asset to activate the alert device. The message may include the location of the asset or information associated with the location, such as an RFID tag serial number for an RFID tag used to track the asset, a MAC address for the asset, or a slot in a rack if the asset is housed in a rack.

In another embodiment, the alert devices for assets may be activated in response to a user request or in response to instructions from a system other than the asset management system. For example, a system administrator or another system may know the locations of certain assets, and requests the alert devices for the assets at the predetermined locations to be activated.

Figure 6:
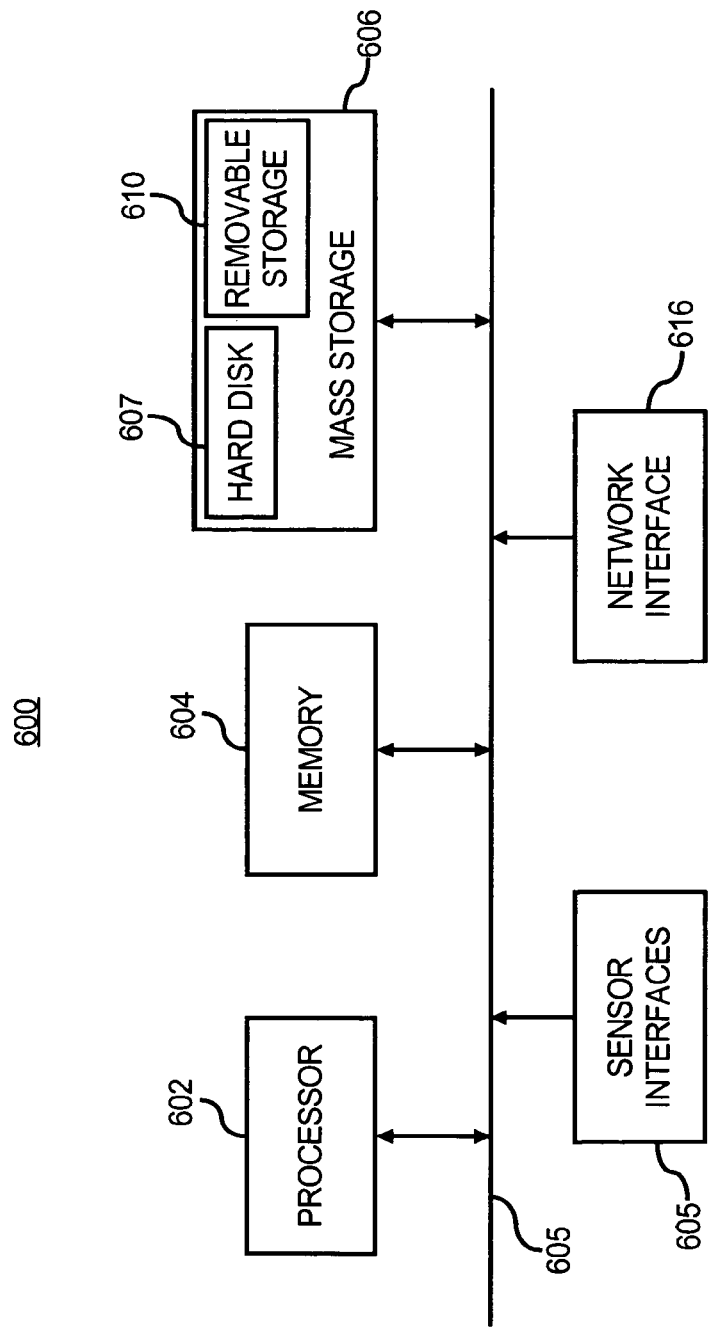
FIG. 6 shows a schematic block diagram of a computer system, according to an embodiment.

FIG. 6 illustrates an exemplary block diagram of a computer system 600 that includes one or more processors, such as processor 602, providing an execution platform for executing software, for example, including at least some of the steps illustrated in the methods 400 and 500 and other steps described herein. The processor 602 may also execute an operating system (not shown) for executing the software in addition to performing operating system tasks. The computer system 600 also includes a main memory 604, such as a Random Access Memory (RAM), where software may be resident during runtime, and mass storage 606. The mass storage 606 may include a hard disk drive 607 and/or a removable storage drive 610, representing a floppy diskette drive, a magnetic tape drive, a compact disk drive, or a flash nonvolatile memory where a copy of software or data may be stored. Applications and resources may be stored in the mass storage 606 and transferred to the main memory 604 during run time. The mass storage 606 may also include ROM (read only memory), EPROM (erasable, programmable ROM), EEPROM (electrically erasable, programmable ROM). A bus 605 is shown for communicating data via components of the computer system 600. Components of the computer system 600 may communicate via a bus 605.

A network interface 616 is provided for communicating with the forwarders 220a-m and other devices via a network. Also, sensor interfaces 608 are provided for connecting to the RFID reader array 213, the sensors 216 and the door position sensor 215 shown in FIG. 2. The computer system 600 is a simplified example of a platform. It will be apparent to one of ordinary skill in the art that the other components may be added or components may be removed as needed. For example, one or more interfaces may be provided for connecting one or more I/O devices.

One or more of the steps of the methods 400 and 500 and other steps described herein and software described herein, such as the modules of the asset management system 102 shown in FIG. 1, may be implemented as software embedded or stored on a computer readable medium, such as the main memory 604 or the mass storage 606, and executed by the processor 602. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

What has been described and illustrated herein are embodiments of systems and methods along with some of their variations. The descriptions and figures used herein are set forth by way of illustration and are not meant as limitations. Those skilled in the art will recognize that many variations are possible within the scope of these embodiments and the scope of the following claims and their equivalents.

What is claimed is:

1. A method of managing assets using at least one policy, the method comprising:
   storing at least one policy associated with managing assets, wherein each of the assets is located in one of a plurality of slots in a rack and includes an RFID tag identifying the asset;
   reading, by an RFID reader array, the RFID tag of each of the assets to detect which slot in the rack the asset is located;
   determining slot location in the rack for each of the assets based on the reading of the RFID tag of each of the assets;
   receiving sensor information indicating a condition of each of the assets;
   determining, by a processing device, whether the at least one policy applies to each of the assets based at least on the slot location and the sensor information of the asset; and
   for each of the assets, performing a control function based on a determination that the at least one policy applies to the asset, wherein performing a control function includes controlling another computer system that is operable to directly or indirectly affect each asset that the at least one policy applies.

2. The method of claim 1, wherein the sensor information is from sensors located on the rack.

3. The method of claim 1, wherein performing a control function comprises:
   generating a user alert indicating that the at least one policy applies.

4. The method of claim 1, wherein determining whether the at least one policy applies further comprises:
   for each asset, determining whether the asset is affected by a rule provided in the at least one policy.

5. The method of claim 1, wherein performing a control function further comprises:
   generating a procedure for managing each asset that the at least one policy applies using the slot location of the asset and parameters specified in the at least one policy for managing the asset.

6. The method of claim 5, wherein the at least one policy includes a policy associated with accessing assets and the at least one policy applies to a plurality of the assets, and generating a procedure further comprises:
   specifying an order for accessing the plurality of the assets based on the locations of the plurality of assets; and
   specifying the location of each of the plurality of the assets in the order.

7. The method of claim 6, wherein the order is based on a user being able to access the plurality of the assets in a least amount of time.

8. The method of claim 6, wherein the plurality of assets are housed in different racks in an area and specifying the order and the location of each of the plurality of assets further comprises:
   generating a map of the area;
   providing a path on the map to be followed by a user for accessing the plurality of assets.

9. The method of claim 6, wherein the assets are housed in the rack, the method further comprising:
   activating an alert device located externally on the rack, to indicate which asset of the plurality of assets needs to be accessed, wherein the alert device is not powered by any of the assets and is not physically connected to any of the assets.

10. The method of claim 5, further comprising:
    determining whether the procedure was performed; and
    generating an alert if the procedure was not performed.

11. A method of activating one or more alert devices based on at least one policy, the method comprising:
    storing at least one policy associated with managing assets, wherein each of the assets is located in one of a plurality of slots in a rack and includes an RFID tag identifying the asset;
    reading, by an RFID reader array, the RFID tag of each of the assets to detect which slot in the rack the asset is located;
    storing, in a data storage device, slot location in the rack for each of the assets based on the reading of the RFID tag of each of the assets;
    receiving sensor information indicating a condition of each of the assets;
    for each asset, determining, by a processing device, whether the at least one policy applies to the asset based at least on the slot location and the sensor information of the asset; and
    for each asset that the at least one policy applies, sending a message from the processing device to a rack controller for activating an alert device, wherein the alert device is located externally on the rack and the alert device is not physically connected and not powered by the asset and wherein the activated alert device provides an audio or visual alert identifying the asset from other assets housed in the rack.

12. A rack controller system for a rack including slots housing assets, wherein each of the assets is located in one of a plurality of slots in the rack and includes an RFID tag identifying the asset, the system comprising:
    an RFID reader array reading the RFID tag of each of the assets to detect which slot in the rack the asset is located and generating slot location in the rack of each asset from the reading of the RFID tag of each asset;
    at least one sensor sensing a condition of each of the assets and generating sensor information indicating the condition of the asset;
    a rack controller receiving the slot location and the sensor information from each of the assets, and sending the received slot location and sensor information to an asset management system remote from the rack for determining whether a policy applies to the asset; and
    alert devices provided externally on the rack and controlled by the rack controller, each alert device located adjacent to one of the slots to provide an alert signal for an asset housed in a corresponding slot, wherein the rack controller is operable to determine, for each asset, whether an alert signal is to be generated for the asset and is further operable to activate the alert device of the alert devices located adjacent to the asset for generating the alert signal for the asset.

13. The system of claim 12, wherein the alert devices comprise at least one of a plurality of visual and audible indicators, each visual or audible indicator being located adjacent to one of the slots.

14. The system of claim 12, wherein the rack controller receives a message from the asset management system requesting activation of an alert device corresponding to an asset housed in the rack.

15. The system of claim 14, wherein the message is generated based on a determination that the policy applies to the asset.

16. The system of claim 14, the policy uses the slot location and sensor information to determine whether to activate the alert device corresponding to the asset.

17. The system of claim 12, wherein the rack controller is operable to activate an alert device corresponding to one of the assets housed in the rack in response to receiving a request identifying the one of the assets.

18. The system of claim 12, wherein the alert devices are physically independent of the assets.

19. The system of claim 12, wherein the rack controller is operable to deactivate the alert device.

20. The method of claim 1, wherein the at least one policy comprises a plurality of policies and different slot locations on the rack have different applicable policies of the plurality of policies.

21. The method of claim 1, wherein each slot stores only one asset.

22. The method of claim 1, wherein the at least one policy comprises a server performing a function and a backup server performing the same function are not to be located in the same rack, and determining whether the at least one policy applies to each of the assets based at least on the slot location and the sensor information comprises:
  determining from the slot location and the sensor information of the assets whether a server performing a function and a backup server performing the same function are located in the rack; and
  performing the control function of migrating the backup server to another rack.

* * * * *